US006486577B1

(12) United States Patent
Ursel et al.

(10) Patent No.: US 6,486,577 B1
(45) Date of Patent: Nov. 26, 2002

(54) APPARATUS FOR REGULATING THE POSITION OF AN ADJUSTABLY POSITIONABLE VEHICLE PART WITH DRIVE SHAFT AND DAMPING MEMBER FOR DAMPING ITS AXIAL DISPLACEMENT

(75) Inventors: Eckhard Ursel, Buehl (DE); Walter Haussecker, Buehlertal (DE); Rainer Kurzmann, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 519 days.

(21) Appl. No.: 09/013,533

(22) Filed: Jan. 26, 1998

(30) Foreign Application Priority Data

Feb. 14, 1997 (DE) ........................ 297 02 525 U

(51) Int. Cl.⁷ .............................................. H02K 5/24
(52) U.S. Cl. .......................... 310/51; 310/90; 74/425; 384/223
(58) Field of Search ...................... 310/83, 51, 90, 310/89; 74/425, 89.14, 594, 409; 384/223, 225, 243

(56) References Cited

U.S. PATENT DOCUMENTS 3,511,920 A * 5/1970 Hertfelder ................ 74/425

5,169,245 A * 12/1992 Harada et al. ............ 384/610
5,212,999 A * 5/1993 Kitada .......................... 74/425
5,747,903 A * 5/1998 Klinger .................... 310/75 R
5,777,411 A * 7/1998 Nakajima et al. .......... 310/83

FOREIGN PATENT DOCUMENTS

DE G 93 13 949.7 3/1995 .................. 310/90

* cited by examiner

Primary Examiner—Karl Tamai
(74) Attorney, Agent, or Firm—Michael J. Striker

(57) ABSTRACT

There is provided an apparatus for regulating the position of an adjustably positionable vehicle part such as a window or movable roof. The apparatus includes an electric drive motor having a drive shaft which is axially displaceable within a fixed limit during driving operation of the shaft. The apparatus also includes a power transfer assembly having a driven member operatively connected to the drive shaft of the electric drive motor for driving movement thereby and a damping member for damping the axial displacement of the drive shaft of the electric motor in one axial direction. The apparatus further includes a housing having a chamber compatibly dimensioned with respect to the damping member for receiving the damping member therein in a press fit disposition.

15 Claims, 2 Drawing Sheets

APPARATUS FOR REGULATING THE POSITION OF AN ADJUSTABLY POSITIONABLE VEHICLE PART WITH DRIVE SHAFT AND DAMPING MEMBER FOR DAMPING ITS AXIAL DISPLACEMENT

BACKGROUND OF THE INVENTION

The present invention relates to an apparatus for regulating the position of an adjustably positionable vehicle part. A regulating apparatus disclosed in German patent document G 93 13 949.7 can be used, for example, to regulate the positioning of windows, movable roofs, or seats. It is therein suggested to provide in such an apparatus damping elements on each end of the drive shaft to accommodate possible displacement within a predetermined tolerance of the drive shaft and thereby avoid the noises arising from changes in the direction of rotation of the shaft. To this end, elastomeric elements in plate form are disposed between a drive shaft housing piece and a support plate in contact with the drive shaft. The drive shaft presses the support plate against the elastomeric elements and this serves to maintain the elastomeric elements in place. However, the occurrence of a misalignment of the drive shaft or aging of the elastomeric material can prevent this arrangement from offering an optimal seating. Moreover, such events may alter the surface pressure on the elastomeric elements whereby the operating condition of the apparatus can be undesirably influenced.

SUMMARY OF THE INVENTION

The present invention provides an apparatus for regulating the position of an adjustably positionable vehicle part which advantageously enhances the reliability of the regulation of the vehicle part to its desired adjusted position. According to one aspect of the present invention, there is provided an apparatus for regulating the position of an adjustably positionable vehicle part which includes an electric drive motor having a drive shaft which is axially displaceable within a fixed limit during driving operation of the shaft. Also, the apparatus includes a power transfer assembly having a driven member operatively connected to the drive shaft of the electric drive motor for driving movement thereby and a damping member for damping the axial displacement of the drive shaft of the electric motor in one axial direction. The apparatus also includes a housing having a chamber compatibly dimensioned with respect to the damping member for receiving the damping member therein in a press fit disposition.

The apparatus of the present invention advantageously maintains the damping member in its desired position such that aging or hardening of the damping member or pressure from a misaligned drive shaft will not displace the damping member from its desired position. Also, the single step of press fitting the damping member into the chamber eliminates the need for additional pieces to maintain the damping member in the chamber.

Another advantage of the apparatus of the present invention lies in the fact that the loading of the damping member by the drive shaft can be selected independent of the already known preloading imposed on the drive shaft in the housing. The preloading of the drive shaft is directly related to its length as produced within tolerance limits, the effects of the preloading on the drive shaft due to its length can be mitigated or eliminated by proper selection of the damping member.

The chamber preferably includes an oversurface having a rib structure which includes a plurality of ribs and the damping member distributes itself around the ribs during its press fit installation, thereby ensuring a firm seating of the damping member in the chamber. Also, the ribs are distributed in spaced manner around the circumferential periphery of the chamber and this facilitates the introduction of the damping member into the chamber.

In certain circumstances, a single rib can ensure a firm seating of the damping member.

The damping member in its uncompressed condition extends axially beyond the chamber such that the drive shaft can work in an undisturbed manner with the damping member without a transfer of vibrations of the drive shaft to the housing.

If the chamber is provided with a shoulder which is engaged by a shoulder on the adjacent axial end of the drive shaft or a shoulder on a plate intermediate the damping member and the drive shaft, this arrangement sets in a straightforward way the maximum limit to which the damping member will be compressed. The damping rubber is thereby protected during the cyclic loading whereby the aging of the damping rubber is slowed and its useful life is extended.

One beneficial feature of the apparatus of the present invention is that the ribs form spaces therebetween having a collective volume capacity sufficient to accommodate the compressed damping member fully within the chamber at the maximum compression of the damping member. The spring rate of the damping member as measured with respect to its effect on the end of the drive shaft thus substantially approaches that of an unconstrained damping member. In this situation, those influences on the spring rate produced by the press fit seating of the damping member are merely negligible.

A particularly favorable spring and damping characteristic can be obtained if the length of the damping member taken in the axial direction of the drive shaft is greater than the width of the damping member measured perpendicularly to its length. In particular, a length to width ratio greater than 1.3:1 is preferred or, even more preferably, a ratio of 1.5:1. By this approach, one achieves a very flat characteristic-force per press in way—so that the influence of the damping member on the shaft is virtually independent from its preload or built in tension. In this manner, a spring rate of less than 50 Newtons per millimeter can be achieved.

The use of a soft rubber and, in particular, a rubber substantially or completely formed of N-butyl beneficially enhances the spring rate.

In the event that a plate is provided intermediate the damping member and the drive shaft, it is advantageous if the plate is retained in another chamber formed in the housing which includes projections that prevent undesired movement of the plate out of the chamber.

DESCRIPTION OF THE PREFERRED EMBODIMENT

Figure 1:
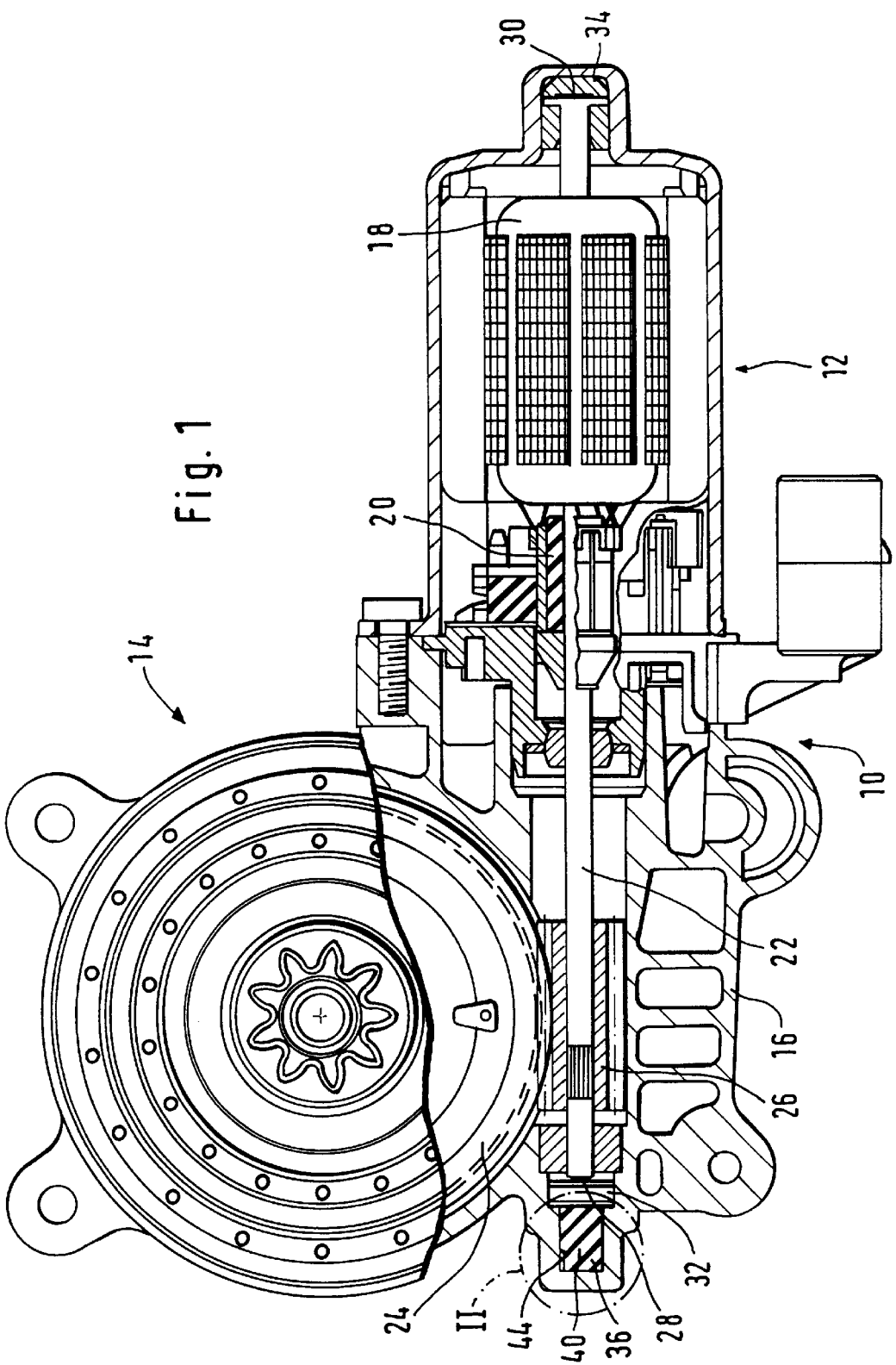
FIG. 1 is a front elevational view, in partial vertical section, of the preferred embodiment of the automotive part regulator of the present invention.
Figure 2:
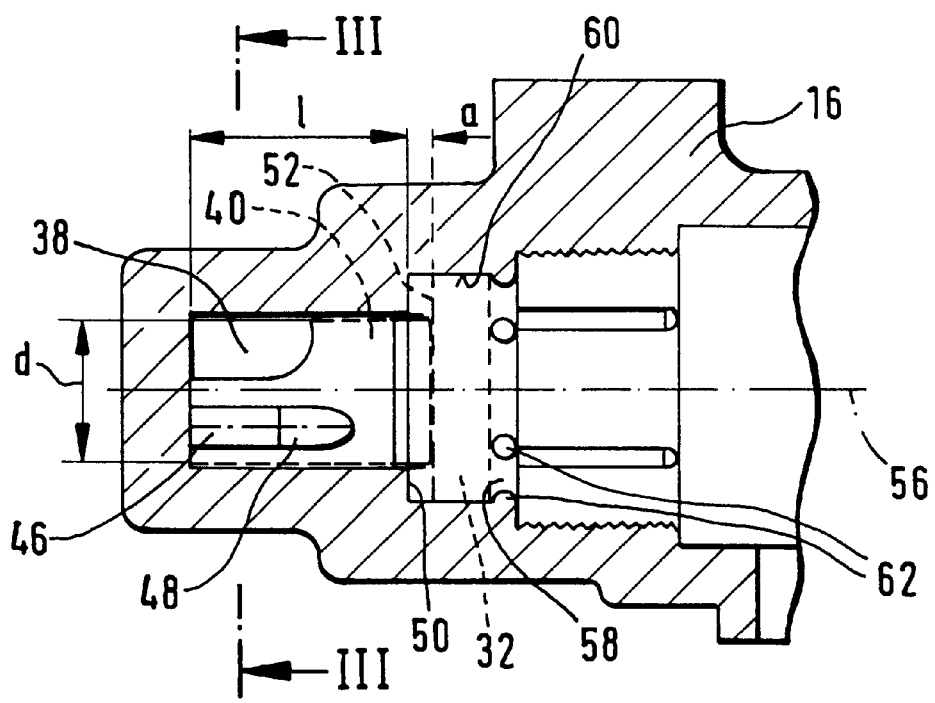
FIG. 2 is an enlarged sectional elevational view of the portion of the regulator, as taken in the broken line circle II shown in FIG. 1.
Figure 3:
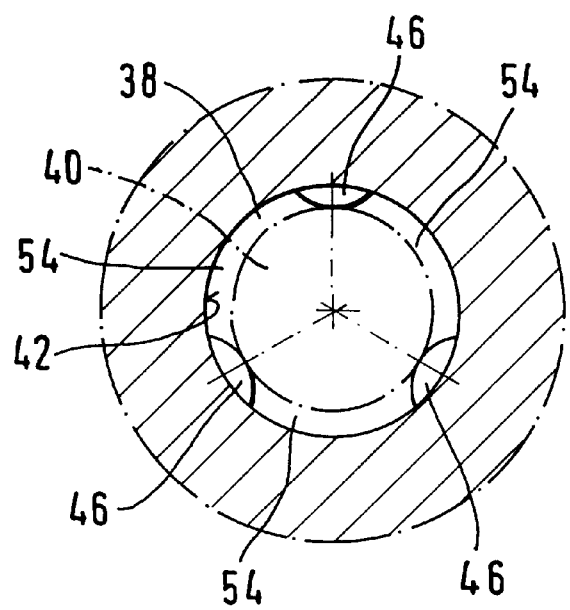
FIG. 3 is a horizontal sectional view of the portion of the regulator shown in FIG. 2, as taken along lines III—III thereof.

As seen in FIGS. 1–3, the preferred embodiment of the 10 of the present invention includes a motor 12 and a power transfer assembly 14, all of which is enclosed in a housing 16. The motor 12 is an electric drive motor and includes a shaft 18, a commutator 20, and multi positionable shaft 22 which extends within the operating range of the 14 for operational engagement therewith. The shaft 22 includes a worm drive gear 24 which threadingly engages a worm gear 26 of the power transfer assembly 14 for transmitting power thereto. The end portions end portion 28 and 30 of the shaft 22 are in contact with rotational support plates 32 and 34, respectively. The plate 32 is in contact with a damping member 36 supported in one portion of the housing 16 while the plate 34 is supported at another portion of the housing 16.

In the vicinity of the end portion 28 of the shaft 22, the housing 16 includes a damping rubber receiving chamber 38, as seen in FIG. 2, in which the damping member 36 is secured in a friction fit manner.

The damping rubber receiving chamber 38 includes, on an oversurface 42 which faces damping rubber 40 of the therein secured damping member 36, a rib structure 44 which comprises a plurality of ribs 46 distributed in spaced manner around the circumferential periphery of the damping rubber receiving chamber 38. Each rib 46 includes a tapered portion 48 on its respective end aligned toward the end portion 28 of the shaft 22, whereby the insertion of the damping rubber 40 into its friction securement within the damping rubber receiving chamber 38 is facilitated.

As delineated in broken lines in FIG. 2, the damping rubber 40 extends axially beyond the damping rubber receiving chamber 38 in the direction toward the end portion 28 of the shaft 22 such that the damping rubber 40 includes an overextending portion of a dimension a. The damping rubber receiving chamber 38 includes, on its chamber opening axial end facing the end portion 28 of the shaft 22, a circumferential shoulder 50 to which a counter shoulder 52 of the plate 32 is disposed in facing relationship and, when the shoulder 50 and the counter shoulder 52 are in contact with one another, the damping rubber 40 is in its maximum compressed state. In this maximum compressed state, the compressed volume of the damping rubber 40 is compressed into the spaces 54 formed within the damping rubber receiving chamber 38 between the spaced ribs 46 of the rib structure 44. The capacity of the spaces 54 to thus accommodate the compressed damping rubber 40 thereby prevents a situation in which the damping rubber 40 is compressed between the shoulder 50 and the counter shoulder 52. The shaft 22 can accordingly be axially shifted within a range of displacement prescribed by the magnitude of the dimension a. Additionally, the spring rate of the damping rubber 40 is not influenced by the compression effect between the shoulder 50 and the counter shoulder 52 but is, instead, substantially that of the damping rubber 40 in a free sprung condition.

The length I of the damping rubber 40 as seen in FIG. 2 is greater than its width—in other words, as the damping rubber 40 is in the form of a cylinder, its length I is greater than its diameter d. The relationship of the length I to the diameter d of the damping rubber 40 is preferably 1.7:1. This relatively elongate form of the damping rubber 40 permits a relatively small spring rate to be achieved since the maximum compression is dictated by the small magnitude of the dimension d relative to the length I.

In the preferred embodiment, the damping rubber 40 is disposed coaxial with the axis 56 of the shaft 22.

The damping rubber 40 is comprised of a soft rubber, preferably an N-butyl rubber and exhibits a spring rate corresponding to its compressibility as dictated by the dimension a less than 50 Newtons per millimeter.

The housing 16 includes another chamber 58 which receives the plate 32 therein and includes a plurality of projections 62 along its oversurface 60 on its end which is oriented toward the end portion 28 of the shaft 22. The projections 62, which prevent movement of the plate 32 out of the chamber 58, can be rounded in shape and are so ordered as to facilitate the disposition of the plate 32 into the chamber 58 which may be accomplished by force fitting the plate 32 past the projections 62 or by orienting the plate 32 at an angle during movement thereof past the projections 62.

What is claimed is:

1. An apparatus for regulating the position of an adjustably positionable vehicle part, comprising: an electric drive motor having a drive shaft which is axially displaceable within a fixed limit during driving operation of the shaft; a power transfer assembly having a driven member operatively connected to the drive shaft of the electric motor for driving movement thereby; a damping member formed as a damping rubber for damping the axial displacement of the drive shaft of the electric motor in one axial direction; and a housing having a chamber compatibly dimensioned with respect to the damping rubber and receiving the damping rubber therein in a press fit disposition, said drive shaft at least at one of its end sides abutting against said housing through said damping rubber.

2. The apparatus according to claim 1 wherein the chamber includes an oversurface having a rib structure which includes a plurality of ribs.

3. The apparatus according to claim 2 wherein the ribs are distributed in spaced manner around the circumferential periphery of the chamber.

4. The apparatus according to claim 1 wherein the damping member extends axially beyond the chamber in the direction toward the drive shaft in the uncompressed condition of the damping rubber.

5. The apparatus according to claim 1 and further comprising a plate disposed intermediate the drive shaft and the damping rubber and the chamber includes, on a chamber opening axial end facing the drive shaft, a circumferential shoulder to which a counter shoulder of the plate is disposed in facing relationship.

6. The apparatus according to claim 3 wherein the ribs form spaces therebetween having a collective volume capacity sufficient to accommodate the compressed damping rubber fully within the chamber.

7. The apparatus according to claim 1 wherein the length I of the damping member is greater than its width d.

8. The apparatus according to claim 1 wherein the relationship of the length I to the diameter d of the damping rubber is preferably greater than 1.3:1.

9. The apparatus according to claim 1, wherein the damping rubber is cylindrical in shape and is disposed coaxial with the drive shaft.

10. The apparatus according to claim 1 wherein the damping rubber exhibits a spring rate as measured in the direction of its compression by the drive shaft less than 50 Newtons per millimeter.

11. The apparatus according to claim 1 the damping rubber is formed of a soft rubber.

12. The apparatus according to claim 1 wherein the damping rubber is at least partially formed of N-butyl rubber.

13. The apparatus according to claim 1 wherein the housing includes a plate disposed intermediate the end of the drive shaft and the damping rubber and another chamber which receives the plate therein and includes a plurality of projections for preventing movement of the plate out of the another chamber.

14. The apparatus according to claim 1 wherein the relationship of the length I to the diameter d of the damping rubber is preferably greater than 1.5:1.

15. An apparatus for regulating the position of an adjustably positionable vehicle part, comprising: an electric drive motor having a drive shaft which is axially displaceable within a fixed limit during driving operation of the shaft; a power transfer assembly having a driven member operatively connected to the drive shaft of the electric motor for driving movement thereby; a damping member formed as a damping rubber for damping the axial displacement of the drive shaft of the electric motor in one axial direction; and a housing, said drive shaft at least at one of its end sides abutting against said housing through said damping member, said housing having a chamber compatibly dimensioned with respect to the damping rubber and receiving the damping member therein in a press fit disposition, said drive shaft at least at one of its end sides abutting against said housing through said damping member, said damping rubber and said chamber of said housing being formed so that said damping rubber is non removably received in said chamber and fully fills said chamber so that there is no gap between said damping rubber and said chamber of said housing.

\* \* \* \* \*